United States Patent [19]

Parisi

[11] Patent Number: 4,630,130
[45] Date of Patent: Dec. 16, 1986

[54] SCANNING SYSTEM FOR CONTROLLING STRAY BEAMS CAUSED BY UNDESIRABLE OPTICAL REFLECTIONS

[75] Inventor: Michael A. Parisi, Ontario, N.Y.
[73] Assignee: Xerox Corporation, Stamford, Conn.
[21] Appl. No.: 789,860
[22] Filed: Oct. 21, 1985
[51] Int. Cl.$^4$ .................. H04N 1/04; G03G 15/04; G02B 26/10
[52] U.S. Cl. ........................ 358/300; 355/8; 350/6.8
[58] Field of Search .............. 355/8, 11, 3 R; 346/108, 160; 350/6.8; 358/293, 300, 302

[56] References Cited

U.S. PATENT DOCUMENTS

| | | | |
|---|---|---|---|
| 4,002,830 | 1/1977 | Brown et al. | 358/293 |
| 4,070,089 | 1/1978 | Grafton | 350/7 |
| 4,202,597 | 5/1980 | Moore | 350/6.8 X |
| 4,247,160 | 1/1981 | Brueggemann | 350/6.8 |
| 4,274,703 | 6/1981 | Fisli | 350/6.8 |
| 4,355,860 | 10/1982 | Lavallee et al. | 350/6.8 |
| 4,441,126 | 4/1984 | Greenig et al. | 358/293 |

FOREIGN PATENT DOCUMENTS 3012870 10/1981 Fed. Rep. of Germany .

Primary Examiner—A. T. Grimley
Assistant Examiner—J. Pendegrass
Attorney, Agent, or Firm—Frederick E. McMullen

[57] ABSTRACT

A system for controlling satellite beams in either a tangentially or sagittally offset optical alignment of the type used with raster scanners without introducing objectionable cross scan bow to the image line wherein the axes of the input beam is set at a predetermined small angle to the scan plane axes of the scan lens and the rotating scanning element are set at a predetermined small opposing angles to one another with respect to the scan to promote divergence of any satellite beams and thereby facilitate intercepting and blocking thereof without interfering with the imaging beam, the angular relationship between the axes of the input beam and scan lens and the axis of the scanning element minimizing cross scan bow of the image line at the image plane.

10 Claims, 7 Drawing Figures

SCANNING SYSTEM FOR CONTROLLING STRAY BEAMS CAUSED BY UNDESIRABLE OPTICAL REFLECTIONS

This invention relates to a scanning system, and more particularly, a scanning system for controlling unwanted satellite beams.

Laser scanners such as raster output scanners have an optical system for sweeping and focusing a beam of high intensity radiation such as a laser beam on a recording member such as the photoreceptor of a xerographic imaging system. The laser beam, which is modulated in accordance with an image signal input, exposes the photoreceptor to create a latent electrostatic image which is thereafter developed and transferred to a copy material to provide a visible copy of the image represented by the image signals. While various types of optical systems can be employed for this purpose, two of the more attractive optical system arrangements are a tangentially offset half-lens arrangement and a sagittally offset half-lens arrangement. Both of these optical arrangements have advantages as well as disadvantages.

A tangentially offset arrangement provides excellent scan line uniformity without objectionable cross scan bow. Unfortunately, this arrangement does not permit ready control over moving and stationary satellites, i.e. stray laser beams caused by undesirable reflections within the optical system. These satellite beams in a tangentially offset arrangement follow the path of the image beam to the photoreceptor and there act to expose the photoreceptor. The result is poor image quality with excessive background. On the other hand, a sagittally offset arrangement offers excellent control over any satellite beams but unfortunately causes objectionable cross scan bow.

In approaching and understanding the problem, one must consider two fundamental relationships. The first is that if a laser beam scanning through a cylinder lens lies in a plane perpendicular to the axis of the cylinder lens, the beam remains in that plane after refraction. However, if the beam scans through a cylinder lens in a plane that is not perpendicular to the axis of the cylinder lens, the refracted beam will not lie in any plane but lie on a conical surface and follow an elliptical path if swept across a planar surface such as a photoreceptor. The resulting image line is curved or bowed across the length of the line. A second relationship is that a laser beam reflected from a rotating scanning element such as a faceted polygon will lie in a plane if the polygon facets are parallel to the axis of rotation of the polygon and the input beam lies in a plane perpendicular to the axis of rotation. On the other hand, if the input beam does not lie in a plane perpendicular to the polygon facets and the axis of rotation of the polygon, then the reflected beam will not lie in a plane but will instead lie on a conical surface and follow an elliptical path when swept across a planar surface such as a photoreceptor. As in the case above, the resulting image line is curved or bowed across the length of the line.

In tangentially offset optical arrangements, the paths of all the beams are in a plane (referred to as the scan plane) which is perpendicular to the axis of the system of lenses and to the axis of rotation of the scanning element. Based on the above discussion, this arrangement will not generate cross scan bow. But since satellite beams also lie in the same plane, satellite beams are difficult to intercept and remove without interfering with the imaging beam. Sagittally offset arrangements also have the axis of rotation of the scanning element, the mirrored facets, and the axis of the lenses all parallel. The input beam however is askew to a plane perpendicular to the facets, the axis of rotation of the scanning element, and the axis of the lenses. As a result, the scanning beam reflected by the facets does not lie in a plane and further will not lie in a plane after passing through the cylinder lenses that follow. Since the input and output beams in this system are askew, the satellite beams are also askew and therefore may be readily intercepted and blocked without interfering with the imaging beam.

The invention provides a method for neutralizing stray or satellite beams which are the source of undesirable exposure of the recording member in a scanning system of the type in which the source beam and scanning beam normally lie in a scan plane without introducing objectionable cross scan bow to the image line being exposed along an image plane, the scanning system including an optical system having an optical axis, the optical system having a rotating scanning element against which the source beam impinges to produce a scanning beam offset from the source beam to avoid interference between the system components and the beams which expose image lines on the recording member, and a lens means for focusing the scanning beam on the recording member, in which the steps comprise setting the axis of the source beam at a slight angle to the scan plane; tilting the lens means at a slight angle to the scan plane; and tilting the scanning element so that the axis of rotation of the scanning element is at a slight angle from the perpendicular to the scan plane whereby satellite beams occurring in the optical system are made to diverge from the source and scanning beams thereby permitting the satellite beams to be intercepted without interfering with the source and scanning beams while establishing angular relationships of the source beam with the lens means and said scanning element that obviates scan line bow at the recording member.

IN THE DRAWINGS

Figure 6:
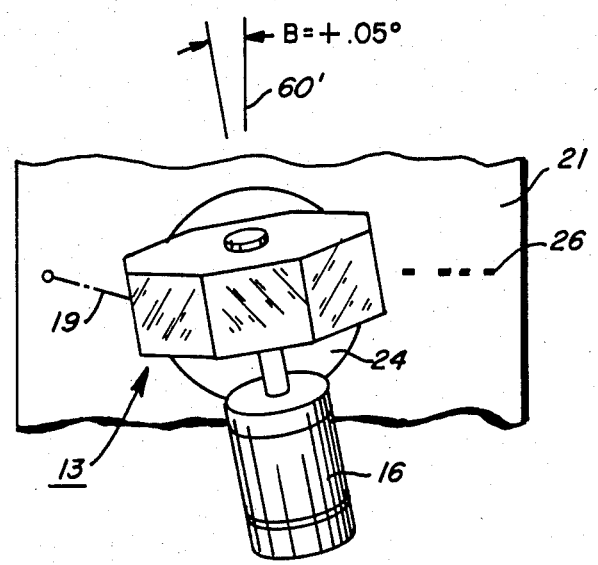
Figure 5:
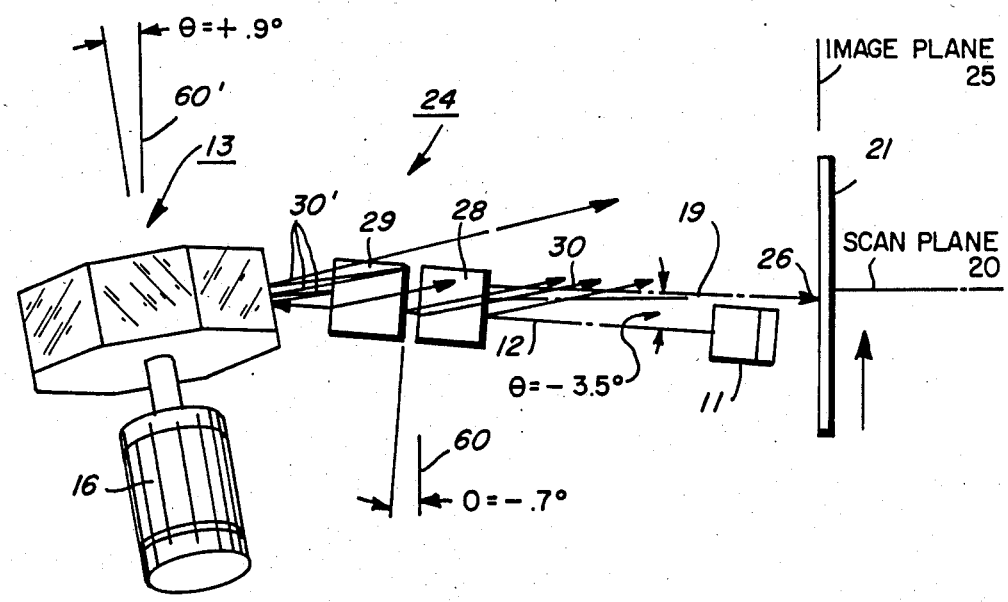

FIG. 5 is a schematic side view of the scanning system optical arrangement of the present invention in which the axes of the optical elements are tilted at predetermined angles with respect to the scan plane and in predetermined directions from the scan plane to provide controlled sagittal offset in the optical path to promote divergence of any satellite beams and thereby enhance intercepting and blocking thereof while neutralizing unavoidable cross scan bow of the image line at the image plane; and FIG. 6 is an end view of the optical arrangement shown in FIG. 5 depicting forward tilting of the scanning element in a plane parallel to the image plane.

While the invention is described in some detail hereinbelow with specific reference to certain illustrated embodiments, it is to be understood that there is no desire to limit it to those embodiments. On the contrary, the intent is to cover all modifications, alternatives, and equivalents falling within the spirit and scope of the invention as defined by the appended claims.

Figure 1:
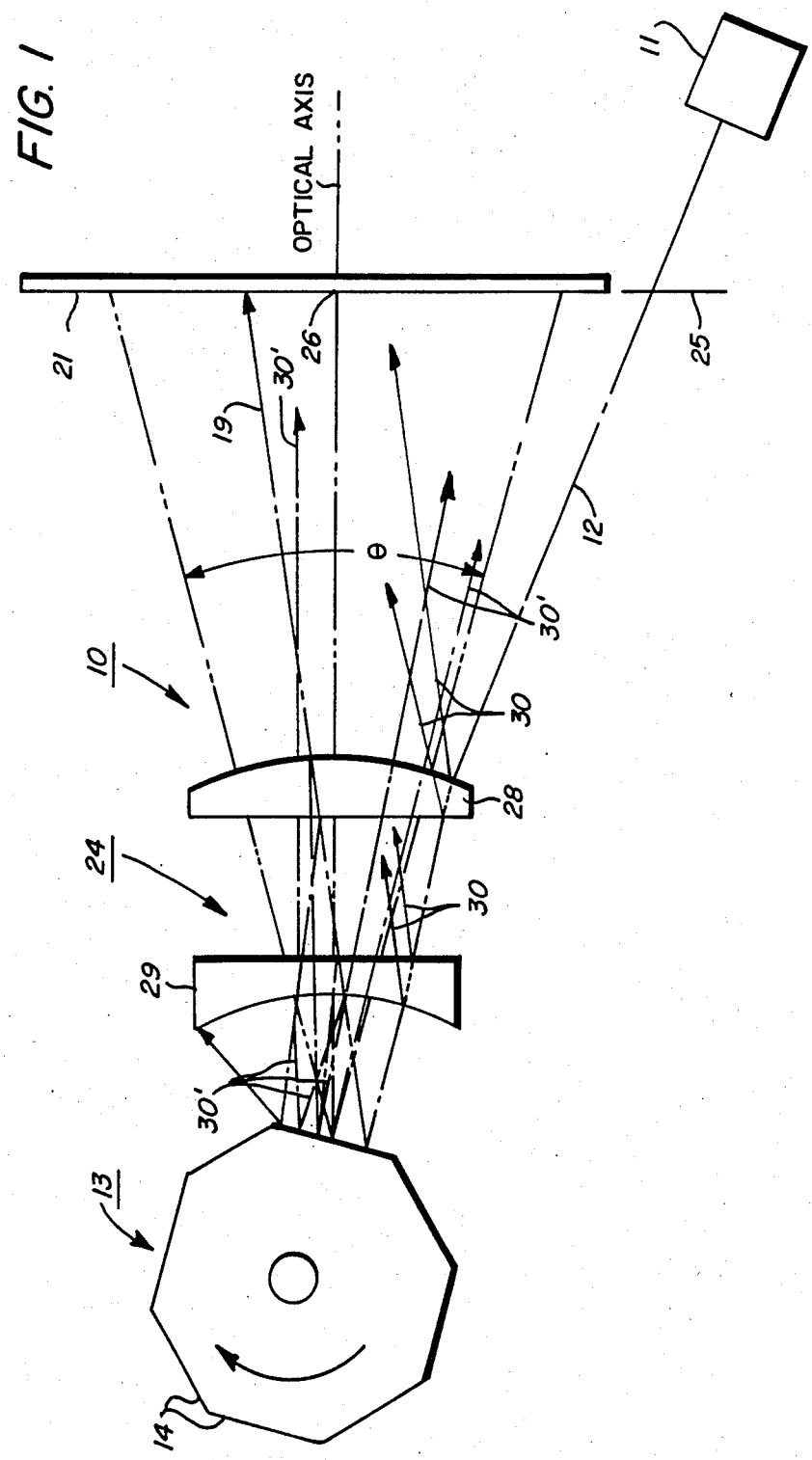
FIG. 1 is a top view illustrating a tangentially offset optical alignment in a scanning system at the scan plane.
Figure 2:
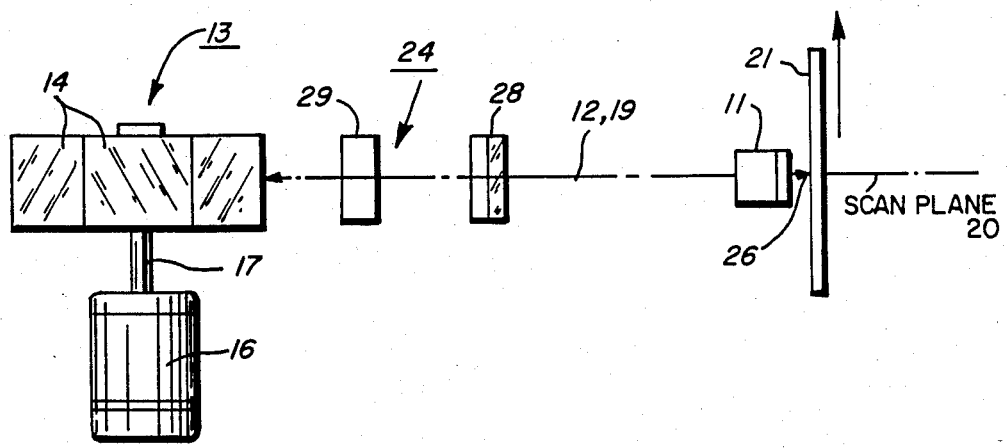
FIG. 2 is a side view of the tangential optical arrangement shown in FIG. 1.

Referring particularly to FIGS. 1 and 2 of the drawings, there is shown a tangentially offset scanning system 10 comprising a laser or other suitable source 11 for supplying a high intensity light beam 12 which is applied to a multi-faceted polygonal beam scanning element 13 having a plurality of substantially identical planar reflective facets 14. A drive motor 16 has an output shaft 17 coupled to the scanning element 13 for rotating the scanning element 13 at a substantially constant angular velocity in the direction of the arrow (FIG. 1). As a result, facets 14 sequentially intercept and reflect the input beam 12 thereby providing a scanning light beam 19 which is cyclically scanned through a predetermined scan angle $\theta$.

Scanning system 10 generates latent electrostatic images on the photoconductive surface 21, shown here in the form of a belt, of a photoreceptor xerographic system (not shown). As will be understood by those familiar with the xerographic arts, latent electrostatic images are created on the previously uniformly charged photoconductive surface 21 through selective exposure thereof in response to image information in the form of video image signals or pixels. The image signals are input to a suitable modulator which modulates the light beam in response thereto to selectively expose surface 21 in accordance with the image content of the image signals. Where the source 11 of beam 12 comprises a laser diode, modulation control over beam 12 is effected through the laser diode and no separate modulator is used as will be understood.

With each sweep of the light beam across the photoconductive surface 21, an image line 26 is exposed. Concurrently, the photoconductive surface 21 is moved or stepped in a direction normal to the beam sweep as shown by the solid line arrow in FIG. 2. The latent electrostatic image created on photoconductive surface 21 is thereafter developed and the developed image transferred to suitable copy substrate material such as a copy sheet. The transferred image is thereafter fixed to form a permanent copy.

Imaging optics 24 are provided to process the input beam 12 on successive ones of the facets 14 and thereafter focus the scanning beam 19 onto the photoconductive surface 21 at image plane 25. Input beam 12 is tangentially offset from the scanning axis of the scanning beam 19 (FIG. 1) to prevent interference with the scanner components.

In the sagittal plane (FIG. 2), the axis of the input and scanning beams 12, 19 respectively are in a common plane referred to herein as scan plane 20.

Imaging optics 24 has lenses 28, 29 for processing input beam 12 on the active facet 14 of scanning element 13 and for focusing the scanning beam 19 on the photoconductive surface 21 at image plane 25. Lenses 28, 29 may comprise cylindrical lenses, spherical lenses, or combinations thereof.

In the above described scanning system, tangential offset of the input and scanning beams 12, 19 respectively prevents the beams from interfering with adjoining parts and components of the scanner. At the same time, tangential offset provides excellent uniformity across the scan line 26 with no cross scan bow. Unfortunately, moving and stationary satellite beams 30, 30', respectively, examples of which are shown in FIG. 1 and which consist of various and sundry stray beams caused by reflections within the scanning system 10, as will appear more fully herein, are also transmitted along the optical path, and with beam 19 impinge on the photoconductive surface 21. Satellite beams 30, 30', striking the photoconductive surface 21 cause undesirable exposure and create residual background, deteriorating image quality. In order to correct for this, a much closer and tighter control over the xerographic image processing system parameters is required which adds to the complexity and expense of the system.

Figure 3:
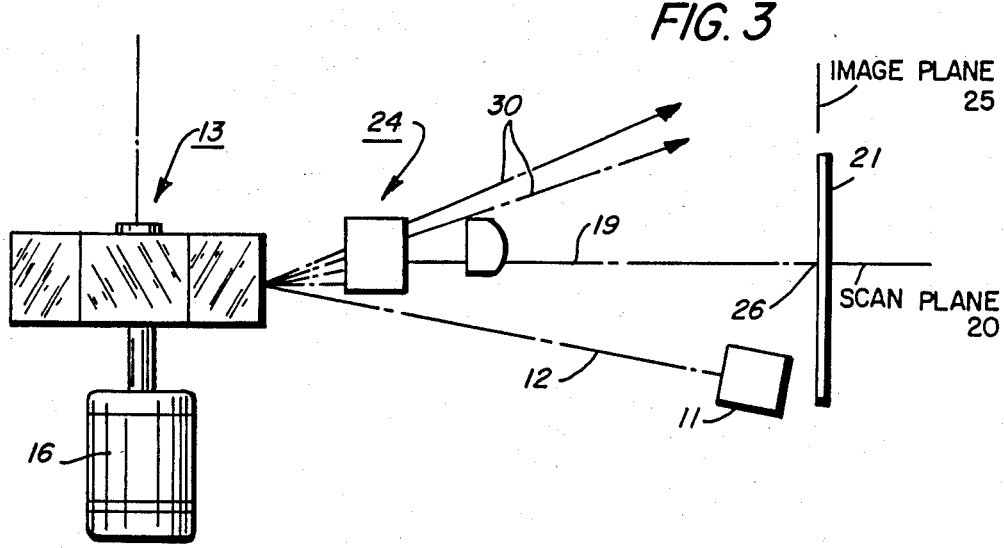
FIG. 3 is a side view illustrating a sagittally offset optical arrangement in a scanning system.

In the arrangement shown in FIG. 3 where like numbers refer to like parts, the input and scanning beams 12, 19 respectively are sagittally instead of tangentially offset. In that arrangement, input beam 12 is at an angle to scan plane 20 and to the axis of rotation of facets 14. As a result, the optical path of any any satellite beams 30, 30' that occur are normally so far separated from the optical path of the imaging beams that the satellite beams either miss the photoconductive surface entirely or are able to be intercepted and blocked from striking the photoconductive surface. This latter may be effected by a beam stop such as an aperture plate disposed in the path of the scanning beam 19 and arranged so that the aperture is aligned with the optical path of beam 19 thereby permitting beam 19 to pass through to the photoconductive surface while blocking any satellite beams traversing along different optical axes.

It will be understood that in both tangentially and sagittally offset systems, the input beam 12 may or may not pass through the scan lenses prior to reaching the facets of the scanning element.

Both the exemplary tangentially and sagittally offset systems have imaging optics composed of a pair of lenses 28, 29. Reflections from the two surfaces of each of lenses 28, 29 (four surfaces total) generate the aforementioned stationary and moving satellite beams 30, 30' respectively with each lens surface reflecting approximately 1% of the input beam power. Secondary reflections, i.e. reflections on reflections, also occur. However, these secondary reflections, which are approximately 0.01% of the input beam power, are normally small enough to be neglected. The four lens surfaces generate four primary stationary satellite beams 30 which are directed toward the photoconductive surface 21, some or all of which strike the photoconductive surface 21.

Additionally, the scanning beam 19 leaving the facets 14 of the rotating scanning element 13 passes through the same lenses 28, 29. In doing this, four lens surfaces are encountered, each reflecting approximately 1% of the beam energy. The resulting moving satellite beams 30' return to the facets 14 of scanning element 13 where the beams 30' are reflected again toward the photoconductive surface 21. This second reflection off of the scanning element facets 14 imparts a second motion to the moving satellite beams 30' which changes the beams original velocity so that the velocity of the beams 30' across the photoconductive surface 21 may be either faster or slower than that of the scanning beam 19.

In a tangentially offset system, the stationary and moving satellite beams 30, 30' respectively are transmitted along the scan plane 20 and with scanning beam 19 impinge on the photoconductive surface 21. Satellite beams striking the photoconductive surface 21 cause undesirable exposure and create residual background, deteriorating image quality. In order to correct for this, a much closer and tighter control over the xerographic image processing system parameters is required which adds to the complexity and expense of the system.

Figure 4A:
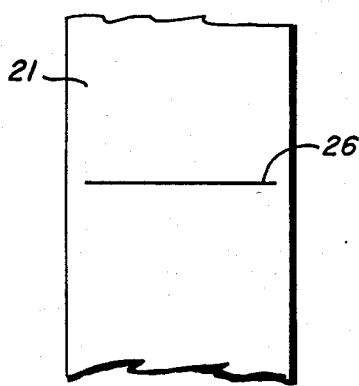
FIG. 4a is a view depicting an exemplary image line in which cross scan bow is absent.
Figure 4B:
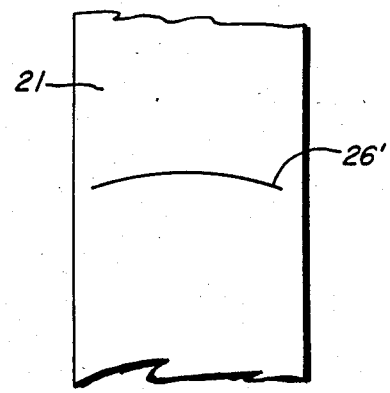
FIG. 4b is a view depicting an exemplary image line in which cross scan bow is present.

On the other hand, a sagittally offset system, which is able to eliminate or at least greatly reduce the incidence of satellite beams striking the photoconductive surface 21, suffers from objectionable image bow across the scan line 26. In FIG. 4a, an example of a scan line 26 having no or very minimal bow is shown. In contrast, FIG. 4b illustrates a line 26' of the type that results from a sagittally offset system in which there is objectionable image bow.

Referring now to FIGS. 5 and 6 where like numbers refer to like parts, in order to eliminate or at least substantially reduce the impingement of stationary and moving satellite beams 30, 30' respectively on the photoconductive surface without objectionable bow of the scan line 26 in a tangentially offset system, the axes of lenses 28, 29 of imaging optics 24, the optical axis of input beam 12, and the axis of scanning element 13 are tilted from the normal so that input and scanning beams 12, 19, while tangentially offset with respect to one another, are at the same time sagittally offset from one another in opposing and largely neutralizing directions while the beams traverse the scanning system optical path. In particular, the axis of beam 12 is set at a relatively small angle $\theta$ to the scan plane 20 (i.e. at a negative angle to the scan plane) while the axes of lenses 28, 29 of imaging optics 24 are tilted forward through a relatively small angle $\theta$ to a line 60 that is perpendicular to the scan plane (i.e. at a negative angle) so that the lenses are at a slight angle angle to the nominal system optical axis. To offset and correct for the objectionable image line bow that the sagittal offset of input beam 12 and tilting of imaging optics 24 would cause at the photoconductive surface 21, the axis of scanning element 13 is tilted backward through a relatively small angle $\theta$ to a line 60' perpendicular to scan plane 20 (i.e. at a positive angle). To further neutralize cross scan bow, the axis of rotation of scanning element 13 is also tilted forward in the direction of scan through a relatively small angle $\beta$ from the line 60' perpendicular to the scan plane 20 and in a plane parallel to the image plane 25 to change the scanning beam position relative to imaging optics 24.

Divergence and separation of any stationary and moving satellite beams 30, 30' respectively occurring in scanning system 10 are enhanced by the sagittal offset within the optical path effected by tilting the system optical elements by predetermined amounts and in predetermined relative directions as described. As in a sagittally offset system this enables satellite beams to be intercepted and blocked prior to reaching the photoconductive surface 21. At the same time, the opposing sagittal offset inducing settings of the system optical elements substantially removes the effect of sagittal offset on the scanning beam at the photoconductive surface 21 thereby eliminating or at least materially reducing objectionable scan line bow.

In a sagittally offset system of the type shown in FIG. 3, the axes of lenses 28, 29 of imaging optics 24 and the axis of scanning element 13 are tilted so that the input and scanning beams 12, 19 respectively are sagittally offset from one another in opposing and largely neutralizing directions. This enhances divergence and separation of any stationary and moving satellite beams 30, 30' respectively, enabling the satellite beams to be intercepted and blocked prior to reaching photoconductive surface 21. At the same time, the opposing sagittal offset inducing settings of the system optical elements substantially removes the effect of sagittal offset on the reflected beam at the photoconductive surface 21 to eliminate or least materially reduce scan line bow.

In one example, in a tangentially offset system of the type shown in FIGS. 1 and 2, the axes of lenses 28, 29 of imaging optics 24 were tilted through an angle $\theta$ of $-0.7°$ with respect to the scan plane while light source 11 was set so that the optical axis of input beam 12 was at an angle $\theta$ of $-3.5°$ with respect to scan plane. The axis of scanning element 13 was tilted in the opposite direction at an angle $\theta$ of $+0.9°$ with respect to the scan plane 20 while the axis of scanning element 13 in the vertical plane was tilted forward in the direction of scanning of beam 19 by an angle $\beta$ of $+0.05°$ with respect to the vertical.

While the invention has been described with reference to the structure disclosed, it is not confined to the details set forth, but is intended to cover such modifications or changes as may come within the scope of the following claims.

What is claimed is:

1. A method for neutralizing stray or satellite beams which are the source of undesirable exposure of the recording member in a scanning system of the type in which the source beam and scanning beam normally lie in a scan plane without introducing objectionable cross scan bow to the image line being exposed along an image plane, the scanning system including an optical system having an optical axis, the optical system having a rotating scanning element against which the source beam impinges to produce a scanning beam offset from the source beam to avoid interference between the system components and the beams which expose image lines on the recording member, and a lens means for focusing the scanning beam on the recording member, in which the steps comprise:

(a) setting the axis of said source beam at a slight angle to said scan plane;

(b) tilting said lens means at a slight angle to said scan plane; and (c) tilting said scanning element so that the axis of rotation of said scanning element is at a slight angle from the perpendicular to said scan plane whereby satellite beams occurring in said optical system are made to diverge from said source and scanning beams thereby permitting said satellite beams to be intercepted without interfering with said source and scanning beams while establishing angular relationships of said source beam with said lens means and said scanning element that obviates scan line bow at said recording member.

2. The method according to claim 1 including the steps of:

(a) setting the axis of said source beam at a slight negative angle to said scan plane;

(b) tilting said lens means so that the axis of said lens means is at a slight negative angle to the system optical axis; and (c) tilting the axis of rotation of said scanning element to a slight positive angle so that the axis of rotation of said scan element is at a slight positive angle from the perpendicular to said scan plane.

3. The method according to claim 2 including the step of:

tilting the axis of rotation of said scanning element in a plane perpendicular to said scan and image planes.

4. The method according to claim 3 including the step of:

tilting the axis of rotation of said scanning element at a slight angle to said perpendicular plane and parallel to said image plane.

5. A method for neutralizing stray beams which create undesirable reflections on the photoreceptor of a raster output scanner, the scanner having an optical system of the type where an input beam impinges against the mirrored facets of a scanning polygon to provide a scanning beam which passes through a scan lens means to said photoreceptor to write images on said photoreceptor along an image plane, the input beam and the scanning beams laying in a scan plane normal to the image plane, said input and scanning beams being tangentially offset from one another, comprising the steps of:

(a) tilting the axis of said scan lens means through a first predetermined negative angle with respect to said scan plane; and (b) tilting the axis of said polygon through a second predetermined positive angle with respect to said scan plane, tilting of said scan lens means and polygon causing said stray beams to diverge from said input and scanning beams whereby to enhance interception and blocking of said stray beams, tiling of said scan lens means and polygon in opposing directions negating any scan line bow introduced by tilting of said scan lens means and polygon.

6. The method of claim 4 including the step of:

offsetting the axis of said input beam through a second predetermined negative angle with respect to said scan plane to enhance divergence of said stray beams.

7. The method according to claim 5 including the step of;

tilting the axis of said polygon in a plane parallel to said image plane through a predetermined angle from the perpendicular to said scan plane to further negate scan line bow.

8. In a scanning system having an optical system with tangentially offset optical elements for exposing a recording member line by line in along an image plane which said optical system elements comprise:

(a) a high intensity imaging beam, the axis of said imaging beam being set at a first predetermined small angle with respect to the plane normal to said image plane at said recording member;

(b) a rotatable scanning element for sweeping said imaging beam across said recording member, the axis of said scanning element being set at a second predetermined small angle with respect to said normal plane;

(c) lens means for focusing said imaging beam onto said scanning element and said recording member, the axis of said lens means being set at a third predetermined small angle with respect to said normal plane whereby a small sagittal offset alignment is introduced into said tangentially offset optical alignment to cause any stationary and moving satellite beams to separate from said imaging beam, the axis of said scanning element being set in a direction opposite to the direction in which the axes of said imaging beam and said lens means are set to obviate any scan line bow caused by said sagittally offset alignment.

9. A method for neutralizing stray beams which create undesirable reflections on the photoreceptor of a raster output scanner, the scanner having an optical system of the type where an input beam is scanned by a rotating scanning element to provide a scanning beam which passes through a lens means to said photoreceptor to write images on said photoreceptor along an image plane, the input beam and the scanning beam being at a slight angle to and on opposite sides of a scan plane normal to the image plane so that said input and scanning beams are sagittally offset from one another, comprising the steps of:

(a) tilting the axis of said lens means through a first predetermined negative angle with respect to said scan plane; and (b) tilting the axis of said scanning element through a second predetermined positive angle with respect to said scan plane;

tilting of said lens means and said scanning element enhancing divergence of said stray beams from said input and scanning beams for interception and blocking while tilting of said lens means and said scanning element in opposing directions negating scan line bow at said photoreceptor.

10. The method according to claim 8 including the step of:

tilting the axis of said scanning element in a plane parallel to said image plane through a predetermined angle from the perpendicular to said scan plane to further negate scan line bow.

* * * * *